March 23, 1926. 1,577,527
W. H. HOYT ET AL
MOTOR VEHICLE WINDSHIELD
Filed August 29, 1924
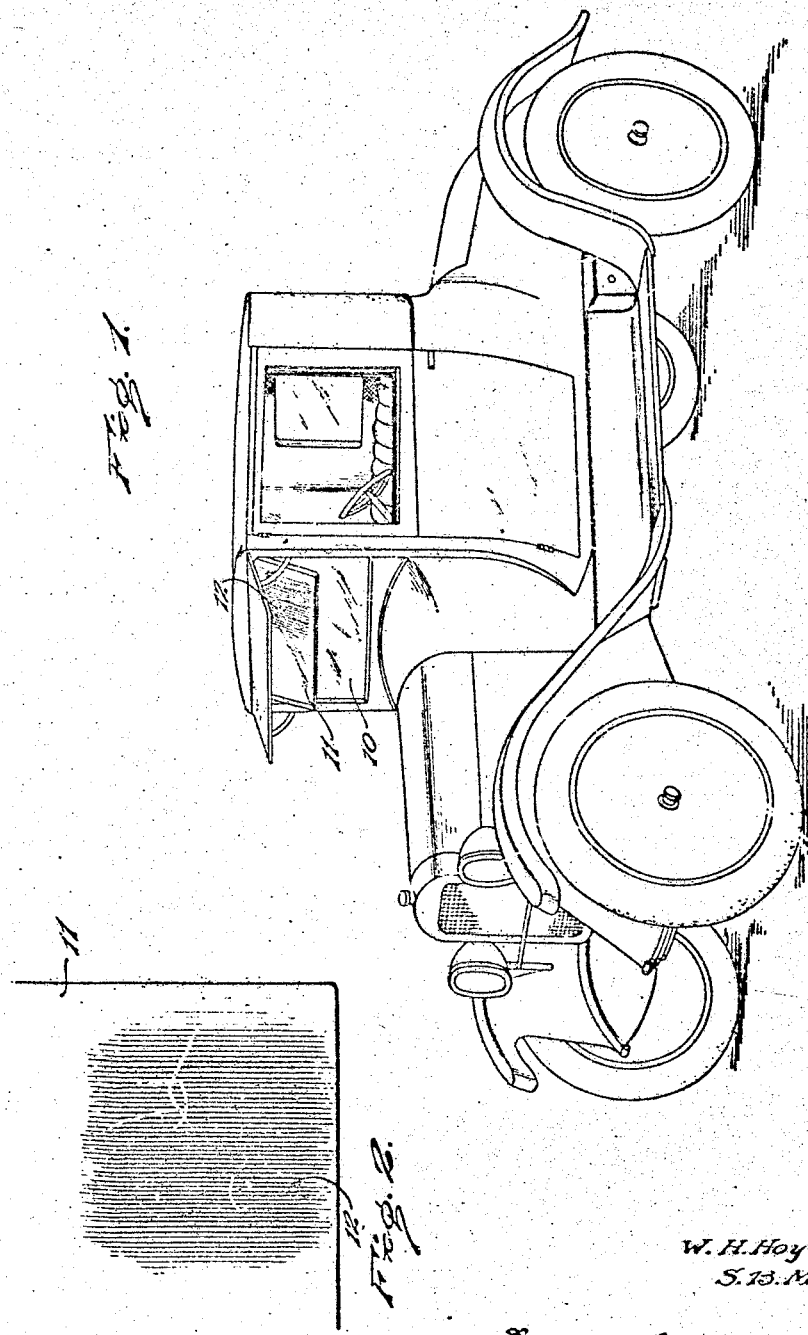
Inventors
W. H. Hoyt
S. B. Mann
By
Attorneys Patented Mar. 23, 1926.

1,577,527

UNITED STATES PATENT OFFICE.

WILLIAM H. HOYT AND SWART B. MANN, OF ONEONTA, NEW YORK.

MOTOR-VEHICLE WINDSHIELD.

Application filed August 29, 1924. Serial No. 734,951.

*To all whom it may concern:*

Be it known that we, WILLIAM H. HOYT and SWART B. MANN, citizens of the United States, residing at Oneonta, in the county of Otsego and State of New York, have invented certain new and useful Improvements in Motor-Vehicle Windshields, of which the following is a specification.

This invention relates to an improved windshield for use upon water and land vehicles as well as air craft but is particularly designed for use upon motor vehicles and seeks to provide a windshield which, while serving all of the functions of ordinary windshields, as now prevalently used, will also serve to shield the eyes of the driver from the rays of the sun, the refraction of the roadway, and particularly from the glare of the headlights of oncoming vehicles.

The invention further seeks to provide a windshield embodying a glass pane having an eye shading area impregnated with a suitable tint for filtering and subduing the light rays passing through said area.

A further object of the invention, in this connection, is to provide a windshield wherein the tinting of the eye shade area of the windshield pane will, towards the margins of said area, gradually fade to gently blend with the color of the clear glass of the pane at all sides of the area so as to thereby avoid abrupt changes to the eyes when shifting the vision to look from the shaded area through the clear portion of the pane or vice versa.

And the invention seeks, as a still further object, to provide a windshield which may be readily embodied in conventional windshield structures.

Other and incidental objects will appear hereinafter.

In the drawings:

Figure 1 is a perspective view showing a conventional motor vehicle equipped with our improved windshield, and Figure 2 is a fragmentary detail elevation showing the manner in which the tinting of the shaded area of the windshield is graduated at the margins of said area.

Referring now more particularly to the drawings, we have shown our improved windshield in conjunction with a conventional motor vehicle and while the vehicle illustrated is of the closed type, still, it is to be understood that the invention may also be used with equal facility in connection with open cars. In the present instance, we have shown the windshield as embodying a lower pane 10 and an upper pane 11. Whether or not, however, the windshield thus embodies two panes or only a single pane, is immaterial, and any approved frame structure as well as any approved mounting for the panes may be employed.

The windshield panes are preferably of plate glass and embodied in the upper pane 11 opposite the driver's seat so as to normally be disposed in the field of vision of the driver, is a tinted eye shading area. This eye shading area may be rectangular, as illustrated, round, elliptical, or any other desired shape and while in the present instance we have shown the upper pane 11 of the windshield as itself provided with the eye shading area still, it is contemplated that, if desired, a separate piece of glass may be similarly provided with a like area and used auxiliary to the windshield pane. The glass of the windshield is impregnated with the coloring tint and, in this connection, it should be observed that any approved tint may be employed. In thus impregnating the glass with the tint, the entire thickness of the glass is colored. It is recognized that eye shading areas have heretofore been employed in connection with the glass panes of a windshield but in most instances the coloring matter has been applied to the external surfaces of the glass with the result that the coloring matter becomes worn or scratched off. Likewise, separate tinted mediums have been applied to the external surfaces of the glass but, as in the former instance noted, these mediums sooner or later become dislodged or marred. Furthermore, etching of the windshield glass has been proposed with unsatisfactory results. In tinting the glass itself, as in the present invention, the difficulties noted are overcome. In so far as we are aware, all eye shading areas or islands heretofore employed in connection with windshields have had sharp and abrupt lines of demarcation between the boundary edges of said areas or islands and the clear glass of the windshields. This has resulted in practically a universal failure of adoption of prior inventions embodying the feature for the reason that in shifting the vision to look from the shaded area or island through the clear glass of the windshield or vice versa, the eyes are subjected to sudden and abrupt light changes with consequent resultant eye strain due to the necessity of the eyes to adjust themselves to suddenly varying intensity of light. The present invention completely overcomes this difficulty by shading the tinted area at its margins. As particularly shown in Figure 2, the tinting of the area 12, at the margins of said area, gradually fades so as to gently blend with the color of the clear glass of the pane. Any abrupt demarcation between the clear glass area and the shaded area is thus avoided with the result that the vision may be shifted from one area to the other without a consciousness of sudden shadow or darkness in one instance as well as without a consciousness of sudden brilliancy in the other instance. We have shown the use of a single shaded area upon the pane 11 of the windshield. However, as will be understood, several such areas may be employed, if desired, and shaped to conform to the general contour of the windshield pane.

Having thus described the invention, what we claim is:

1. The combination with a windshield, of a tinted eye shading area having the tint thereof gradually fading out at the margins of said area.

2. In a windshield, a clear glass pane having a portion thereof tinted to form an eye shading area gradually fading out in hue at the margins of said area.

3. In a windshield, a clear glass pane having a portion thereof impregnated with a color tint to form an eye shading area gradually fading out in hue at the margins of said area to gently blend with the color of the clear glass of the pane.

In testimony whereof we affix our signatures.

WILLIAM H. HOYT. [L. S.]
SWART B. MANN. [L. S.]